(12) United States Patent
Ahn et al.

(10) Patent No.: US 10,602,091 B2
(45) Date of Patent: Mar. 24, 2020

(54) METHOD AND SYSTEM FOR PROVIDING VIDEO CALL SERVICE

(71) Applicant: Hyperconnect, Inc., Seoul (KR)

(72) Inventors: Sangil Ahn, Cheongju-si (KR); Hyeok Choi, Seoul (KR)

(73) Assignee: Hyperconnect, Inc., Seoul (KR)

( * ) Notice: Subject to any disclaimer, the term of this patent is extended or adjusted under 35 U.S.C. 154(b) by 0 days.

(21) Appl. No.: 16/363,856

(22) Filed: Mar. 25, 2019

(65) Prior Publication Data

US 2019/0297301 A1    Sep. 26, 2019

(30) Foreign Application Priority Data

Mar. 26, 2018 (KR) .................. 10-2018-0034189

(51) Int. Cl.
*H04N 7/14* (2006.01)
*H04N 7/15* (2006.01)
*G06K 9/00* (2006.01)

(52) U.S. Cl.
CPC ......... *H04N 7/147* (2013.01); *G06K 9/00315* (2013.01); *G06K 9/00355* (2013.01); *H04N 7/152* (2013.01); *H04N 7/157* (2013.01)

(58) Field of Classification Search
CPC ........ H04N 7/147; H04N 7/157; H04N 7/152; G06K 9/00355; G06K 9/00315
See application file for complete search history.

(56) References Cited

U.S. PATENT DOCUMENTS

| 2009/0002479 A1* | 1/2009 | Sangberg | H04N 7/147 348/14.02 |
| 2012/0206560 A1* | 8/2012 | Setton | H04N 7/147 348/14.08 |
| 2014/0139609 A1* | 5/2014 | Lu | H04N 7/15 348/14.03 |

* cited by examiner

*Primary Examiner* — Stella L. Woo
(74) *Attorney, Agent, or Firm* — H.C. Park & Associates, PLC

(57) ABSTRACT

Disclosed are a method of learning relationship among characters in video call or its background, temporal and spatial information, and visual objects and automatically recommending and providing a visual object using the relationship, and a system configured to execute the method. A method of providing video call may include: storing a visual object selection model including relation information between at least one visual object and at least one selection factor, by a video call providing system; and automatically determining, by the video call providing system, a recommended visual object to be displayed on at least one of a terminal and a counterpart terminal of the terminal performing video call, at a point of time specified for displaying a visual object, based on the visual object selection model.

11 Claims, 9 Drawing Sheets

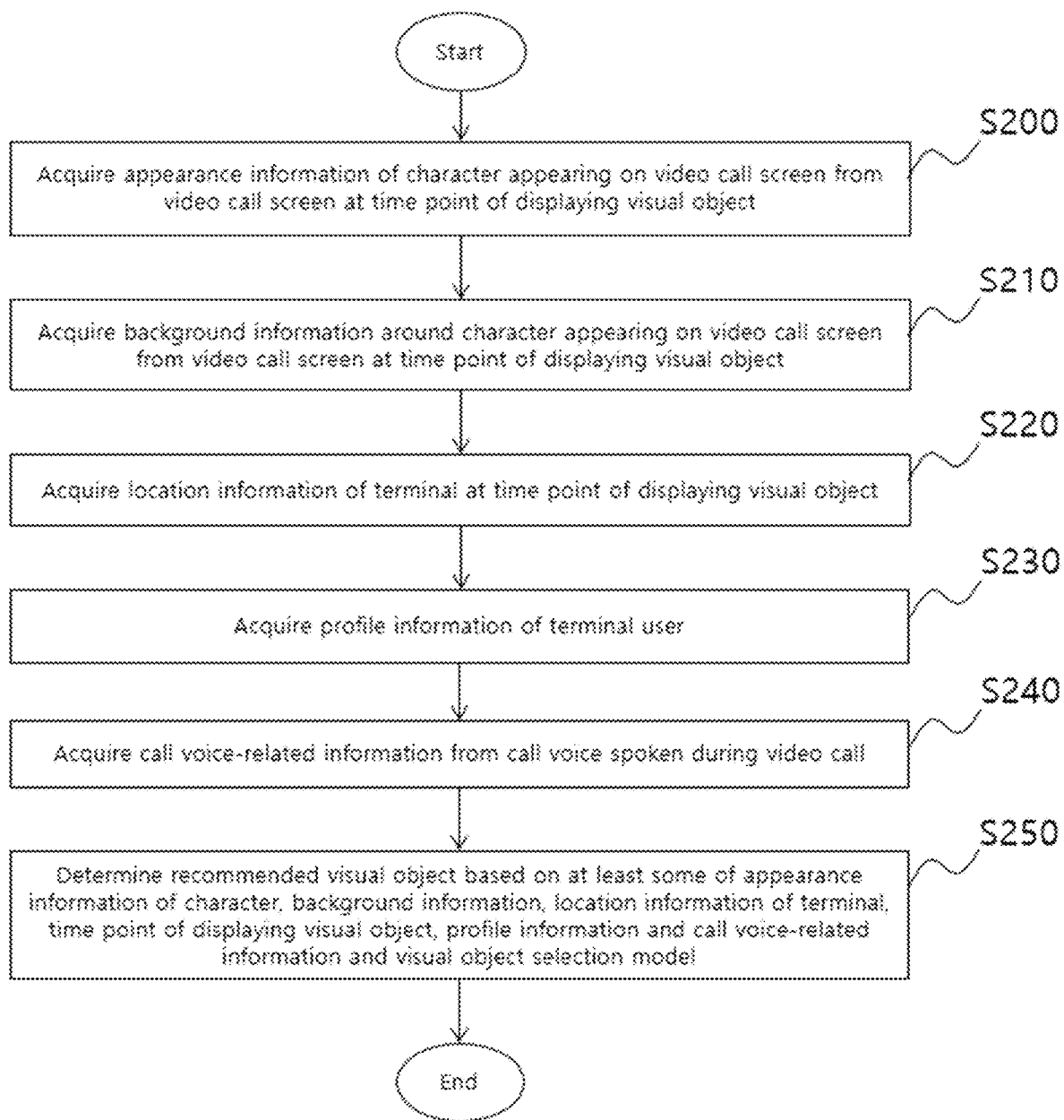

METHOD AND SYSTEM FOR PROVIDING VIDEO CALL SERVICE

CROSS REFERENCE TO RELATED APPLICATION

This application claims priority from and the benefit of Korean Patent Application No. 10-2018-0034189, filed on Mar. 26, 2018, which is hereby incorporated by reference for all purposes as if fully set forth herein.

BACKGROUND

Field

Exemplary implementations of the invention relate generally to a method and a system for providing video call service and, more specifically, a method of automatically recognizing a relationship among the characters or backgrounds, temporal and spatial information, and visual objects in the video call service through machine learning, and automatically recommending and providing a visual object using the relationship, and a system configured to execute the method.

Discussion of the Background

As communication techniques are developed and personal devices such as a smart phone, a tablet PC, and the like are widely distributed recently, methods enabling easy communication among users using the techniques are widely studied. As representative communication media using the personal devices and the communication techniques, there are social media, chatting services, and the like.

Meanwhile, in association with advancement in camera and display technologies, a large number of personal devices appearing recently are equipped with a camera module capable of photographing images and videos and a display of high resolution, and video chatting services (video call services) meeting the characteristics of the high-performance personal devices are also on the rise.

As communications are vitalized through various media, diverse techniques for making users' communication more interesting are also proposed, and emoticons or emojis are representative techniques thereof. By inserting emoticons during conversation, users may express their feelings or intentions in the conversation, attract the other character's interest in the conversation, and give them fun.

Meanwhile, in the case of chatting, which is a representative communication channel, awkwardness may persist when those who are in conversation do not know each other or have no friendship, and as a result, the conversation does not go smooth or either party may leave the chatting room in a severe case. Accordingly, there is a growing demand for devices (ice breakers) that will eliminate a feeling of tension or awkwardness among the speakers and soften the atmosphere of conversation, and particularly, in the case of a service appearing recently, in which a counterpart is randomly selected like random chatting, the ice breakers are regarded as very important.

The above information disclosed in this Background section is only for understanding of the background of the inventive concepts, and, therefore, it may contain information that does not constitute prior art.

SUMMARY

Devices constructed and methods according to exemplary implementations of the invention are capable of providing a video call service with reduced awkwardness and induce a more natural video call by learning a relationship among the characters or backgrounds in video call, temporal and spatial information, and visual objects through a machine learning, and automatically recommending a visual object appropriate to a situation of the video call using the relationship.

Additional features of the inventive concepts will be set forth in the description which follows, and in part will be apparent from the description, or may be learned by practice of the inventive concepts.

According to one or more embodiments of the invention, a method of providing video call service by performing the video call on user terminals, the method including the steps of: storing, by a video call providing system, a visual object selection model including relation information between at least one visual object and at least one selection factor; and automatically determining, by the video call providing system, a recommended visual object to be displayed on user terminals of the user terminals performing video call, and automatically recommending the visual object at a point of specified for displaying a visual object, based on the visual object selection model and a selection condition, the selection condition including: at least one appearance condition of a character; at least one background condition; at least one time-related condition; at least one location-related condition; a profile condition; and a call voice-related condition, wherein the determining of the recommended visual object may include: acquiring the at least one appearance information of a character appearing on a video call screen from the video call screen photographed by at least one of the user terminals at the point of time specified for displaying the visual object; acquiring the at least one background information around the character appearing on the video call screen from the video call screen photographed by at least one of the user terminals at the point of time specified for displaying the visual object; acquiring location information of the user terminals; acquiring profile information of a user of the user terminals; acquiring call voice-related information from a call voice of the video call performed at the user terminals; and determining any one of the at least one visual object as the recommended visual object based on at least one of the at least one appearance information of the character, the at least one background information, the location information of the user terminals, the point of time specified for displaying the visual object, the profile information and the call voice-related information, and the visual object selection model.

Each of the at least one appearance condition of a character may include at least one of a facial expression condition, a gesture condition, and a wearing item condition, and wherein the acquiring of the at least one appearance information of a character appearing on a video call screen may include: acquiring facial expression information of the character from the video call screen of the user terminals; acquiring gesture information of the character from the video call screen of the user terminals; and acquiring wearing item information of the character from the video call screen of the user terminals.

Each of the call voice-related conditions may include at least one of a voice tone condition and a communication context condition, and the acquiring of the call voice-related information includes: acquiring voice tone information from a call voice spoken during the video call; and acquiring call context information from the call voice spoken during the video call.

The storing the visual object selection model may include: specifying, by the video call providing system, the selection condition corresponding to a training visual object, the training visual object being selected by a user while the user terminals perform video call; creating, by the video call providing system, the visual object selection model based on the selection condition corresponding to the selected training visual object; and storing the created visual object selection model, by the video call providing system, and wherein the specifying of the selection condition corresponding to the selected training visual object may include: creating an appearance condition of the character appearing on the video call screen of the user terminals, which will be included in the selection condition corresponding to the selected training visual object, from the video call screen in response to the selected training visual object being selected; creating a background condition around the character appearing on the video call screen of the user terminals, which will be included in the selection condition corresponding to the selected training visual object, from the video call screen in response to the selected training visual object being selected; creating a time-related condition by acquiring information on a time of the selected training visual object being selected, which will be included in the selection condition corresponding to the selected training visual object; creating a location-related condition by acquiring location information of a user who has selected the selected training visual object, which will be included in the selection condition corresponding to the selected training visual object; creating a profile condition by acquiring profile information of the user who has selected the selected training visual object, which will be included in the selection condition corresponding to the selected training visual object; and creating a call voice-related condition by acquiring a call voice spoken during a predetermined time period including a point of time of selecting the selected training visual object, which will be included in the selection condition corresponding to the selected training visual object.

The creating of the visual object selection model may include: creating the visual object selection model by performing machine learning using a training visual object selected by at least one of the user terminals and the selection condition corresponding to each of the training visual objects as learning data.

The method may further include: displaying the determined visual object on a video call screen of at least one of the user terminals.

According to one or more embodiments of the invention, a computer-readable recording medium stores instructions that, when executed by a computer, causes the computer to perform the method described above.

According to one or more embodiments of the invention, a computing system includes: a processor; and a memory storing instructions that, when executed by the processor, may cause the computing system to perform the method described above.

According to one or more embodiments of the invention, a system for providing a video call includes: a storage module configured to store a visual object selection model including relation information between at least one visual object and at least one selection condition; and a control module configured to automatically determine a recommended visual object that will be displayed on at least one of user terminals performing the video call, at a point of time specified for displaying a visual object, based on the visual object selection model and a selection condition, the selection condition including: at least one appearance condition of a character; at least one background condition; at least one time-related condition; at least one location-related condition; a profile condition; and a call voice-related condition, wherein the control module may be configured to: acquire the at least one appearance information of a character appearing on a video call screen from the video call screen photographed by at least one of the user terminals at the point of time specified for displaying the visual object; acquire the at least one background information around the character appearing on the video call screen from the video call screen photographed by at least one of the user terminals at the point of time specified for displaying the visual object; acquire location information of the user terminals; acquire profile information of a user of the user terminals; acquire call voice-related information from a call voice of the video call performed at the user terminals; and determine any one of the at least one visual object as the recommended visual object based on at least one of the at least one appearance information of the character, the at least one background information, the location information of the user terminals, the point of time specified for displaying the visual object, the profile information and the call voice-related information and the visual object selection model.

Each of the at least one appearance condition of a character included in the visual object selection condition may include: at least one of a facial expression condition, a gesture condition and a wearing item condition, and wherein the control module may be configured to acquire: facial expression information of the character; gesture information of the character; and wearing item information of the character from the video call screen in order to acquire the appearance information of the character appearing on the video call screen from the video call screen photographed by the terminal at the point of time specified for displaying the visual object.

The system constructed may further include: a selection condition creation module configured to specify the selection condition corresponding to the selected training visual object, in response to a training visual object being selected by a user while the plurality of terminals performs video call; and a selection model creation module configured to create the visual object selection model based on the selection condition corresponding to each of the selected training visual objects, wherein the selection condition creation module may be configured to: create an appearance condition of the character appearing on the video call screen, which will be included in the selection condition corresponding to the selected training visual object, from the video call screen in response to the selected training visual object being selected; create a background condition around the character appearing on the video call screen, which will be included in the selection condition corresponding to the selected training visual object, from the video call screen in response to the selected training visual object being selected; creating a time-related condition by acquiring information on a time of the selected training visual object being selected, which will be included in the selection condition corresponding to the selected training visual object; creating a location-related condition by acquiring location information of a user who has selected the selected training visual object, which will be included in the selection condition corresponding to the selected training visual object; creating a profile condition by acquiring profile information of the user who has selected the selected training visual object, which will be included in the selection condition corresponding to the selected training visual object; and creating a call voice-related condition by acquiring a call voice spoken during a predetermined time period including a point of time of selecting the selected training visual object, which will be included in the selection condition corresponding to the selected training visual object.

The selection model creation module may be configured to create the visual object selection model by performing machine learning using a training visual object selected by at least one of the user terminals and the selection condition corresponding to each of the training visual objects as learning data.

The system may include a display module for displaying the determined recommended visual object on a video call screen of the user terminal or a counterpart user terminal of the user terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 7 is a flowchart illustrating a method of determined a recommended visual object by a video call providing system constructed according to an exemplary embodiment of the present disclosure.

DETAILED DESCRIPTION

Figure 1:
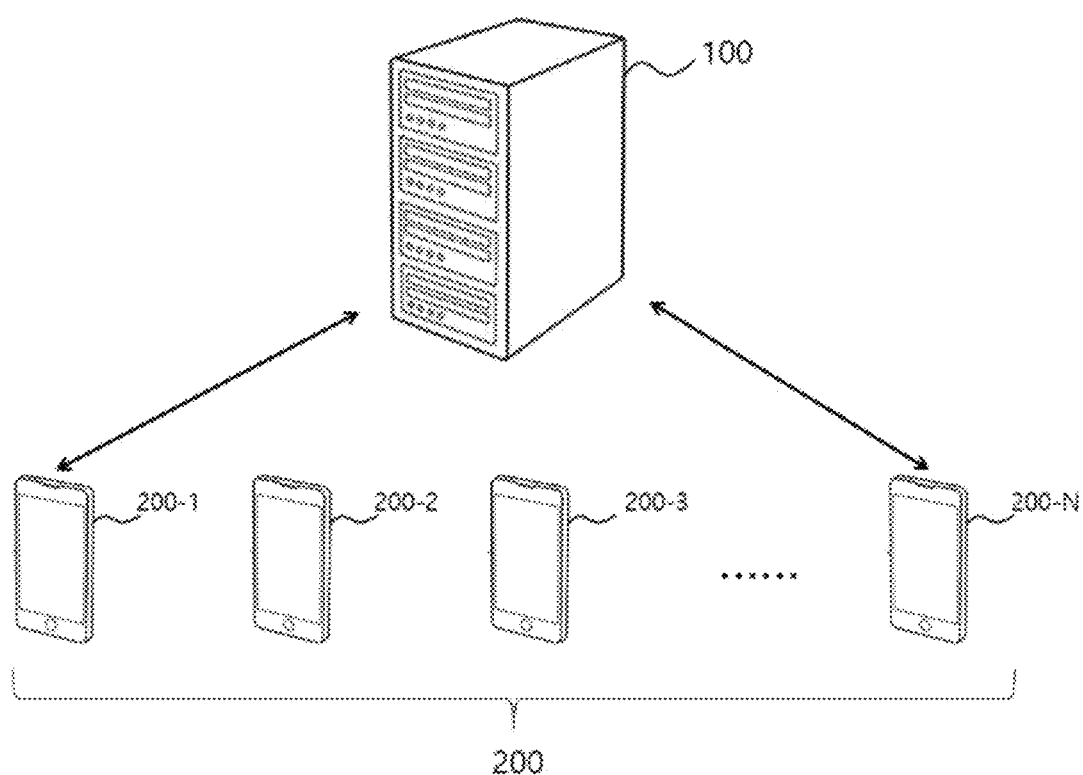
FIG. 1 is a schematic drawing of an environment for providing a video call service according to an exemplary embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a schematic drawing of an environment for providing a video call service according to an exemplary embodiment of the present disclosure (hereinafter, referred to as a 'video call providing method').

Referring to FIG. 1, a video call providing system 100 may be provided to implement a video call providing method according to an exemplary embodiment of the present disclosure.

The video call providing system 100 may be a system for providing a video call service to a terminal 200. The video call is a means for allowing at least two user to converse with each other through video and may be referred to as image communication, image chatting, video chatting, video conference or the like.

Although an example of performing the video call by a first terminal 200-1 and a second terminal 200-2 will be described hereinafter, the spirit of the present invention is not limited to the description. Arbitrary two terminals among a plurality of terminals 200-1 to 200-N connected to the video call providing system 100 may perform video call, and according to embodiments, three or more terminals may perform video call.

Each of the first terminal 200-1 and the second terminal 200-2 performing the video call may photograph images of a user using the terminal through a camera module, provide the images to a counterpart, and display images of the counterpart received from a counterpart terminal. An application specified for video call may be installed in the terminal 200 performing the video call.

The video call providing system 100 may match two terminals 200-1 and 200-2 among a plurality of terminals 200-1 to 200-N so that the two terminals 200-1 and 200-2 may perform video call. The video call providing system 100 may match the two terminals through a specified matching algorithm.

The video call providing system 100 may intermediate the first terminal 200-1 and the second terminal 200-2, which desire to perform video call with each other, and allow the first terminal 200-1 and the second terminal 200-2 to establish a session for video call. Then, the first terminal 200-1 and the second terminal 200-2 may establish a session for video call and perform the video call.

The video call providing system 100 may be a server.

The terminal 200 may be an information processing device provided with a network communication function. For example, the terminal 200 may be a processing device, including a desktop computer, a laptop computer, and a handheld device such as a cellular phone, a satellite phone, a cordless phone, a session initiation protocol (SIP) phone, a wireless local loop (WLL) station, a smart phone, a tablet PC, a personal digital assistant (PDA) or the like.

The video call providing system 100 is connected to the terminal 200 through a communication network and may transmit and receive various kinds of information, data and/or signals needed for implementing the spirit of the present invention. In addition, if necessary, one or more terminals 200-1 to 200-N may communicate with each other and transmit and receive various kinds of information, data and/or signals needed for implementing the spirit of the present invention.

Meanwhile, according to embodiments, unlike the system as shown in FIG. 1, the video call providing system 100 may be implemented in the form of a subsystem included in the terminal 200.

Meanwhile, the first terminal 200-1 and/or the second terminal 200-2 performing video call may display a visual object.

Hereinafter, the visual object may mean an object visually expressed through a display device provided in the terminal 200. For example, the visual object may be an emoticon, an emoji, a sticker, an acticon (animated emoji) or the like.

The visual object may be a static image, a dynamic image played back one time, a dynamic image repeatedly played back, or a combination of these.

The video call providing system 100 may provide information needed by the terminal 200 to display the visual object, and the terminal 200 may display the visual object on the basis of the provided information.

The first terminal 200-1 and the second terminal 200-2 performing video call may display the visual object on a screen, and hereinafter, a specific embodiment will be described with reference to FIGS. 2A and 2B. Hereinafter, a user of the first terminal 200-1 is referred to as user A, and a user of the second terminal 200-2 is referred to as user B.

Figure 2A:
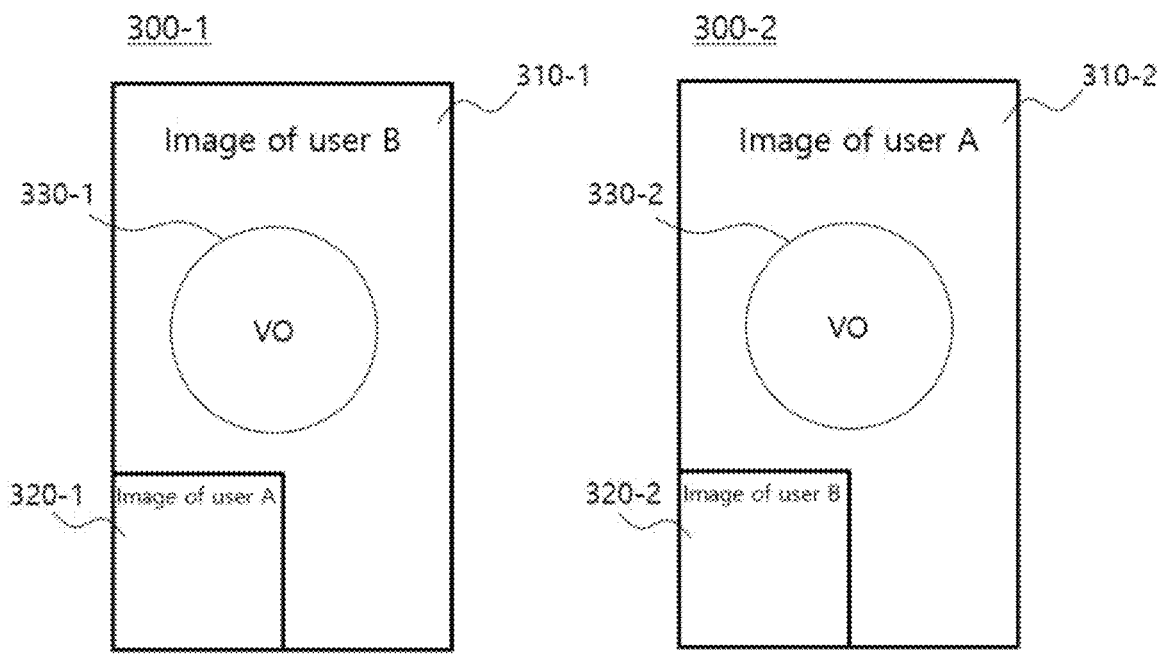
FIGS. 2A and 2B are schematic drawings showing exemplary video call screens displaying visual objects on the video call screens.
Figure 2B:
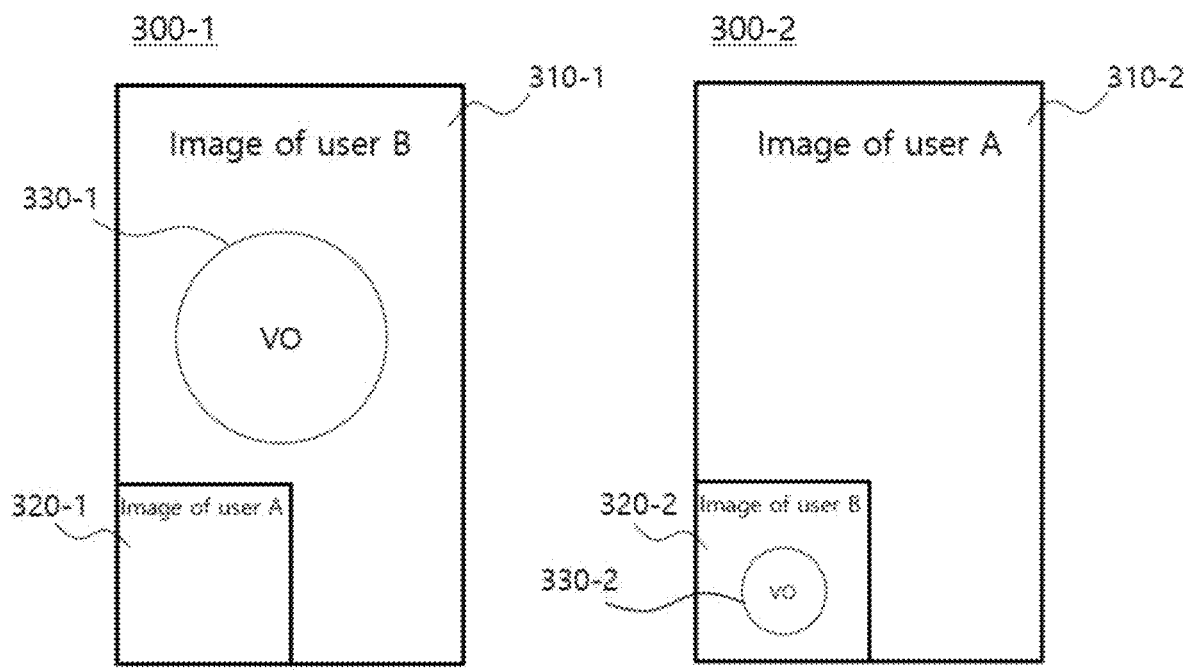

Referring to FIGS. 2A and 2B, the second terminal 200-2 may photograph an image of user B through a provided camera module and provide the image to the first terminal 200-1. A first image 310-1 (an image of user B) photographed by the second terminal 200-2 and provided to the first terminal 200-1 may be displayed on the screen 300-1 of the first terminal 200-1.

On the other hand, the first terminal 200-1 may photograph an image of user A through a provided camera module and provide the image to the second terminal 200-2. A second image 310-2 (an image of user A) photographed by the first terminal 200-1 and provided to the second terminal 200-2 may be displayed on the video call screen 300-2 of the second terminal 200-2.

According to exemplary embodiments, an image 320-1 including a view of user A, who is the user of the first terminal 200-1, may be further displayed on the video call screen 300-1 of the first terminal 200-1, and an image 320-2 including a view of user B, who is the user of the second terminal 200-2, may be further displayed on the video call screen 300-2 of the second terminal 200-2.

FIGS. 2A and 2B are schematic drawings showing exemplary video call screens displaying visual objects on the video call screens. Referring to the embodiment of FIG. 2A, the first terminal 200-1 may display the visual object 330-1 to be overlaid with the first image 310-1. In addition, the second terminal 200-2 may display the visual object 330-2 to be overlaid with the second image 310-2.

Referring to the exemplary embodiment of FIG. 2B, unlike FIG. 2A, the first terminal 200-1 may display the visual object 330-1 to be overlaid with the first image 310-1, and the second terminal 200-2 may display the visual object 330-2 to be overlaid with the second image 310-2.

The visual object displayed on the first terminal 200-1 and/or the second terminal 200-2 may be selected by a user performing video call through the first terminal 200-1 or the second terminal 200-2.

For example, the video call providing system 100 may provide the first terminal 200-1 with a list of at least one visual object that can be provided by the video call providing system 100, and the first terminal 200-1 may display the list of at least one visual object. Then, the user of the first terminal 200-1 may select an object from the list of at least one visual object, and the video call providing system 100 may provide information on the selected visual object to the first terminal 200-1 and/or the second terminal 200-2, and the first terminal 200-1 and/or the second terminal 200-2 may display the selected visual object.

On the other hand, the visual object displayed on the first terminal 200-1 and/or the second terminal 200-2 may be automatically selected by the video call providing system 100.

The video call providing system 100 may collect various kinds of information needed for selecting the visual object from the first terminal 200-1 and/or the second terminal 200-2 and automatically select any one among the at least one visual object on the basis of the collected information.

Figure 3A:
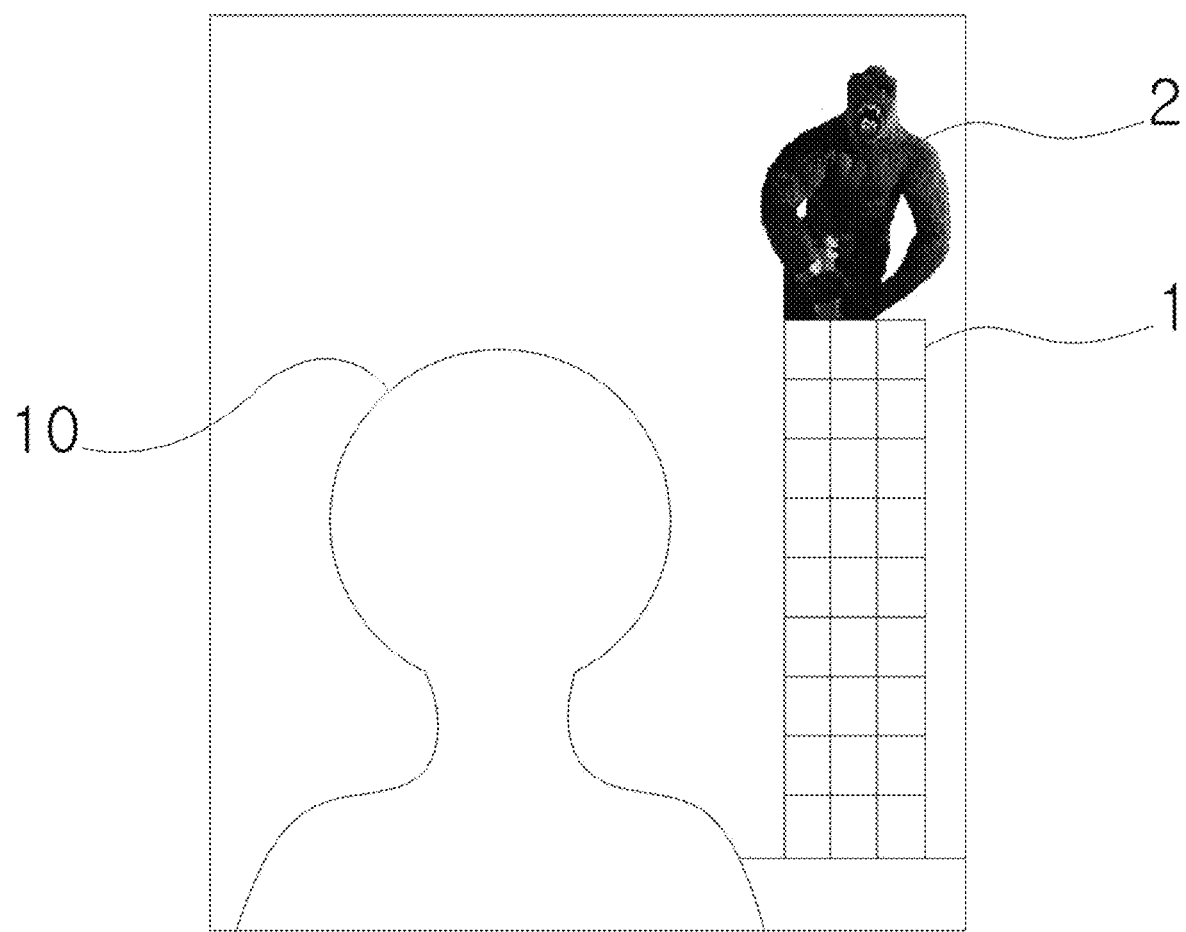
FIGS. 3A, 3B, and 3C are exemplary video call screens on a user terminal respectively displaying a visual object, automatically selected by the video call providing system constructed according to an exemplary embodiment of the present disclosure.
Figure 3B:
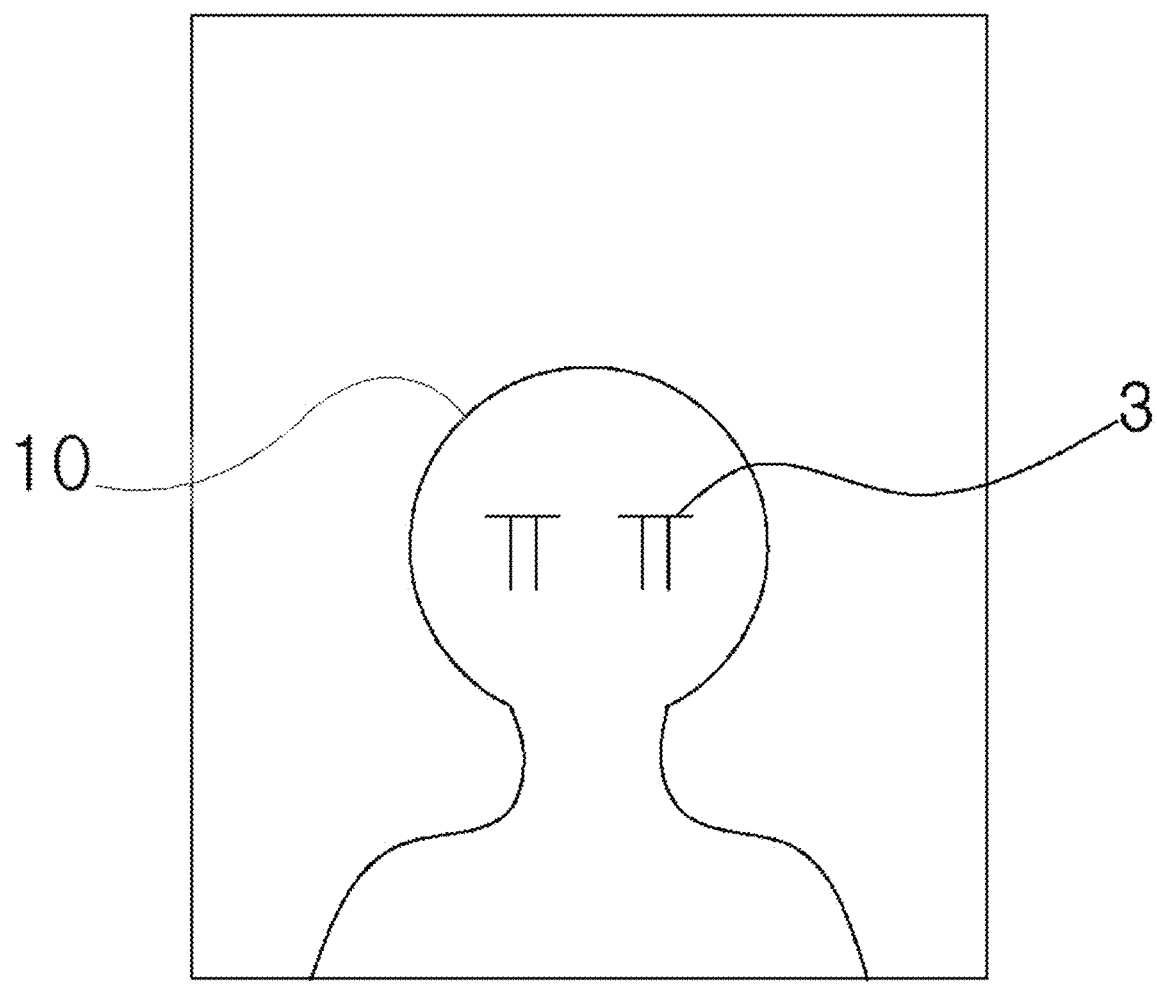
Figure 3C:
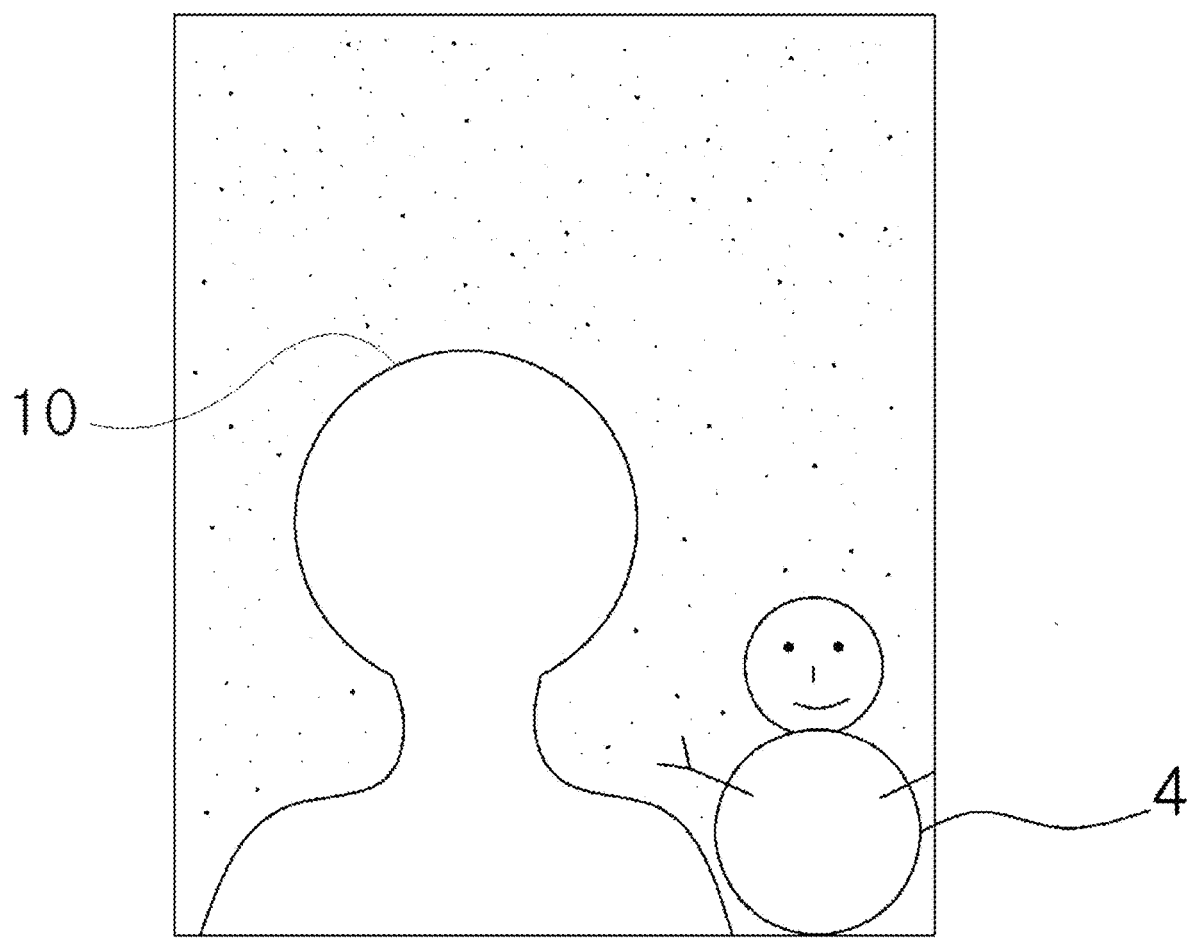

FIGS. 3A, 3B, and 3C are exemplary video call screens on a user terminal displaying a visual object automatically selected by the video call providing system 100.

For example, when it is determined that a building 1 exists in the background of a character 10 of a user who is in video call as shown in FIG. 3A, the video call providing system 100 may automatically select and display a visual object of a shape of King Kong 2.

Or, when it is determined that a character 10 of a user in video call makes a crying face 3 as shown in FIG. 3B, the video call providing system 100 may automatically select and display a visual object of a shape of a crying face 3.

Or, when it is determined that it is snowing during video call as shown in FIG. 3C, the video call providing system 100 may automatically select and display a visual object of a shape of a snowman 4.

A further detailed method of automatically selecting a visual object by the video call providing system 100 will be described below.

Figure 4:
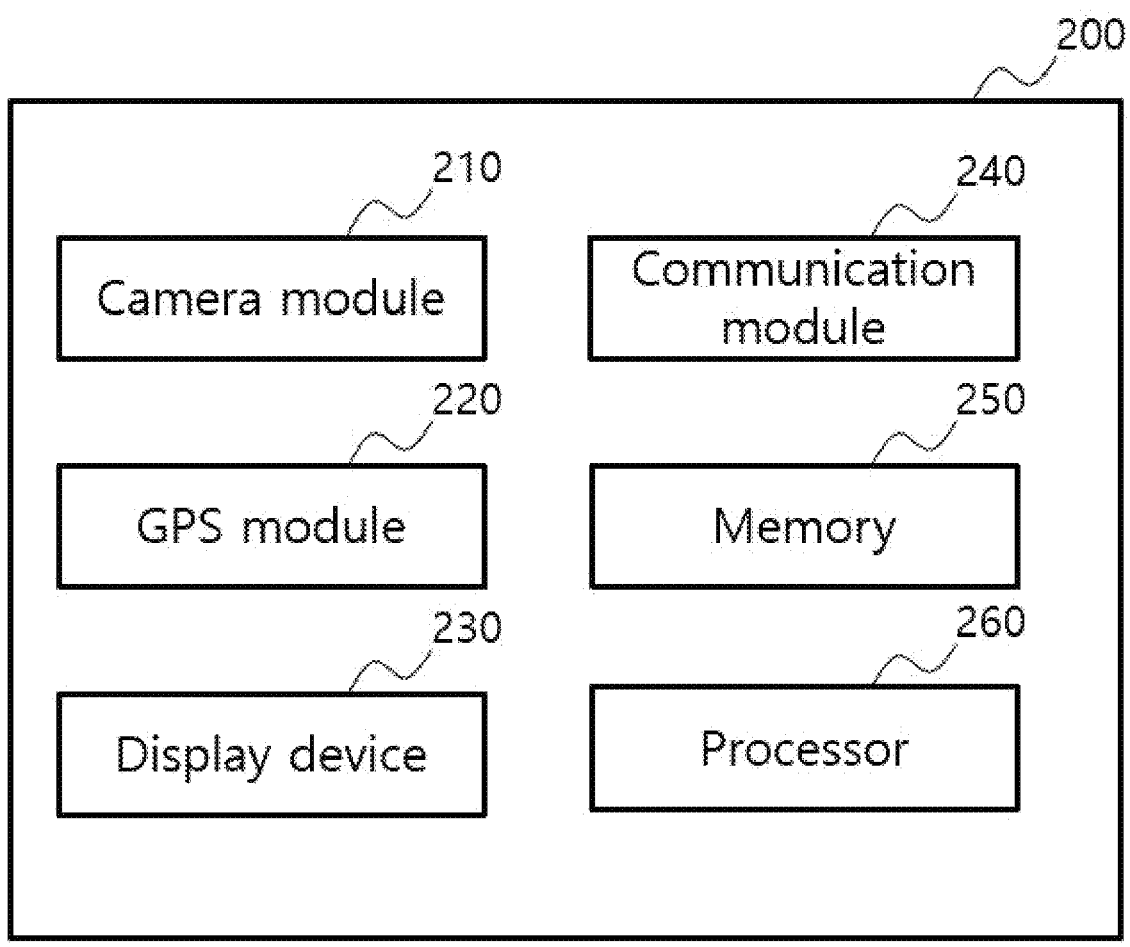
FIG. 4 is a block diagram schematically showing the configuration of a user terminal for providing the video call service according to an exemplary embodiment of the present disclosure.

FIG. 4 is a block diagram schematically showing the configuration of a user terminal 200 for providing the video call service according to an exemplary embodiment of the present disclosure.

Referring to FIG. 4, the terminal 200 may include a camera module 210, a GPS module 220, a display device 230, a communication module 240, a memory 250 and a processor 260. According to an exemplary embodiment of the present disclosure, some of the components described above may not correspond to a component necessarily required for implementing the present invention, and in addition, according to embodiments, it is apparent that the terminal 200 may include further more components than the components as shown in the figure.

The camera module 210 may converts an image captured through a lens into a digital signal and may be used to photograph a picture or a moving image. The camera module 210 may include an image sensor, such as a charge coupled device (CCD) sensor or a complementary metal oxide semi-conductor (CMOS) sensor, a lens, an infrared filter and the like.

The GPS module 220 may receive GPS information from global positioning system (GPS) satellites.

The display device 230 is a device capable of outputting visual information and may include a liquid crystal display (LCD), a light emitting diode (LED) display, a plasma display panel (PDP) display, an organic LED (OLED) display, a surface-conduction electron-emitter display (SED) and the like. The display device 230 may be a touch screen.

The communication module 240 performs communication with external devices and may transmit and receive various kinds of signals, information and data. The communication module 240 may include a long distance communication module such as a 3G module, a long term evolution (LTE) module, an LTE-A module, a Wi-Fi module, a Wireless Gigabit (WiGig) module, an ultra-wide band (UWB) module, a Local Area Network (LAN) card or the like or a short distance communication module such as an Magnetic Secure Transmission (MST) module, a Bluetooth module, an Near-Field Communication (NFC) module, an Radio-Frequency ID (RFID) module, a ZigBee module, a Z-Wave module, an Infrared (IR) module or the like.

The memory 250 may store various kinds of data, such as data received/inputted from external devices, data created by the terminal 200 and the like, and computer programs. The memory 250 may include volatile memory and non-volatile memory. The memory 250 may include, for example, flash memory, ROM, RAM, EEROM, EPROM, EEPROM, a hard disk, and a register. Or, the memory 250 may include a file system, a database, and an embedded database.

The processor 260 is connected to other configurations (e.g., the camera module 210, the GPS module 220, the display device 230, the communication module 240, and the memory 250) included in the terminal 200 and may control their functions and/or resources.

Figure 5:
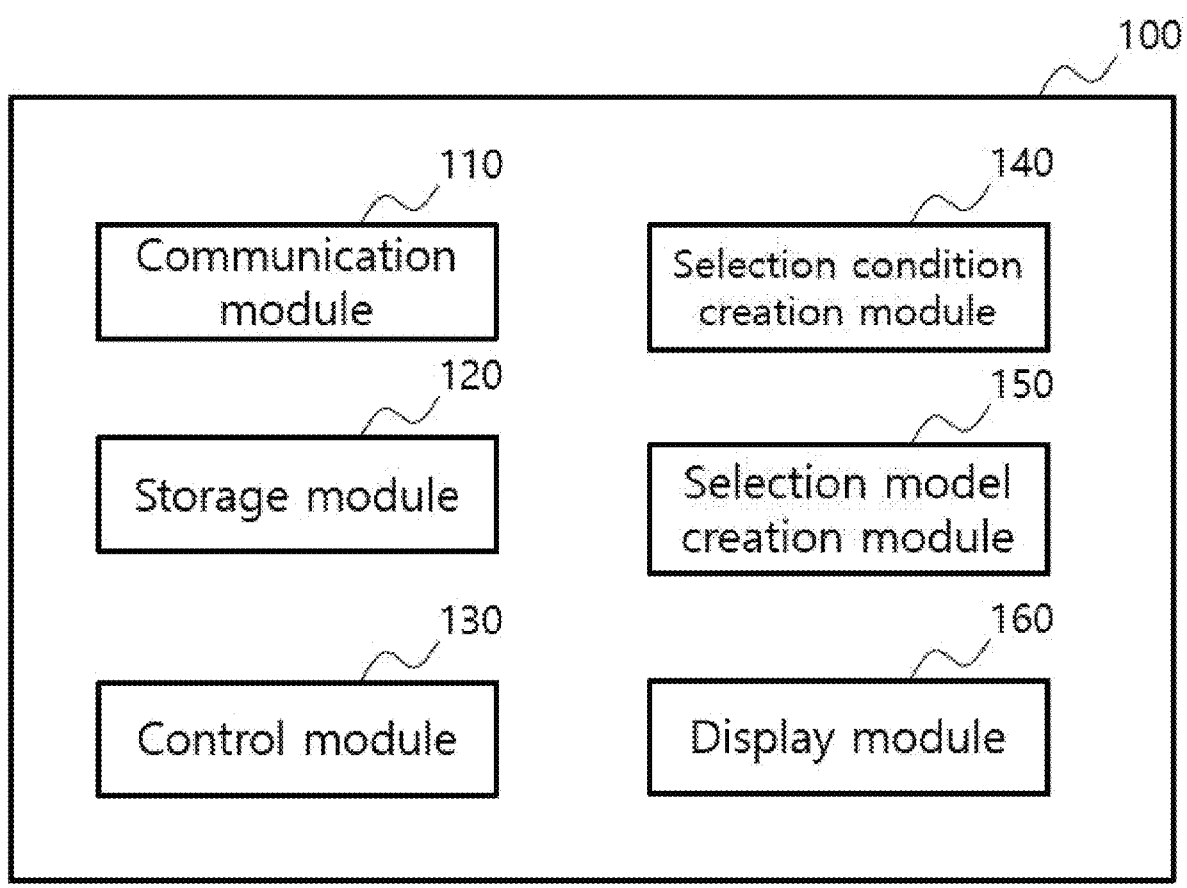
FIG. 5 is a block diagram schematically showing the configuration of a video call providing system constructed according to an exemplary embodiment of the present disclosure.

FIG. 5 is a block diagram schematically showing the configuration of a video call providing system 100 constructed according to an exemplary embodiment of the present disclosure.

Referring to FIG. 5, the video call providing system 100 may include a communication module 110, a storage module 120, a control module 130, a selection condition creation module 140, and a selection model creation module 150. According to an exemplary embodiment of the present disclosure, some of the components described above may not correspond to a component necessarily required for implementing the present invention, and in addition, according to embodiments, it is apparent that the video call providing system 100 may include further more components than the components as shown in the figure.

The video call providing system 100 may have hardware resources and/or software needed for implementing the spirit of the present invention and does not necessarily mean a physical component or a device. That is, the video call providing system 100 may means a logical combination of hardware and/or software provided to implement the spirit of the present invention and, if necessary, may be implemented as a set of logical configurations installed in devices separated from each other and performing their functions to implement the spirit of the present invention. In addition, the video call providing system 100 may mean a set of configurations separately implemented for each function or role to implement the spirit of the present invention. In addition, a module in this specification may mean a functional or structural combination of hardware for implementing the spirit of the present invention and software for driving the hardware. For example, the module may mean a logical unit of a specified code and hardware resources for executing the specified code, and those skilled in the art may easily infer that the module does not necessarily mean a physically connected code or a kind of hardware.

Continuously referring to FIG. 1, the communication module 110 performs communication with external devices and may transmit and receive various kinds of signals, information and data. For example, the communication module 110 may perform communication with the terminal 200. The communication module 110 may include a long distance communication module such as a 3G module, a long term evolution (LTE) module, an LTE-A module, a Wi-Fi module, a WiGig module, an ultra-wide band (UWB) module, a LAN card or the like or a short distance communication module such as an MST module, a Bluetooth module, an NFC module, an RFID module, a ZigBee module, a Z-Wave module, an IR module or the like.

The storage module 120 may store various kinds of data, such as data received/inputted from external devices, data created by the terminal 200 and the like, and computer programs. For example, the storage module 120 may store information on one or more visual objects, profile information previously inputted by a user (e.g., date of birth, age, sex, nationality, address, access place, field of interest and the like) or the like. The storage module 120 may include volatile memory and non-volatile memory. The storage module 120 may include, for example, flash memory, read only memory (ROM), random access memory (RAM), electrically erasable read only memory (EEROM), erasable programmable read only memory (EPROM), electrically erasable programmable read only memory (EEPROM), a hard disk, and a register. Or, the storage module 120 may include a file system, a database, and an embedded database.

The control module 130 is connected to other configurations (e.g., the communication module 110, the storage module 120 and the like) included in the video call providing system 100 and may control their functions and/or resources. In addition, the control module 130 may control the video call providing system 100 to perform a visual object providing method described below. The control module 130 may include a processor such as a processing unit (CPU central), a graphics processing unit (GPU), a micro controller unit (MCU), a microprocessor and the like.

The storage module 120 may store information on at least one visual object and information on at least one selection condition.

The selection condition stored in the storage module 120 may include at least some of i) at least an appearance condition of a character, ii) at least a background condition, iii) at least a time-related condition, iv) at least a location-related condition, v) a profile condition and vi) a call voice-related condition.

The appearance condition of a character is a condition related to the appearance of the character itself in video call, and each appearance condition of a character may include at least one of a facial expression condition, a gesture condition, and a wearing item condition.

The facial expression condition may be a condition related to whether a character in video call makes a specific facial expression. As described below, the control module 130 and/or the selection condition creation module 140 may determine a facial expression that a character in video call makes and acquire facial expression information by analyzing a video call screen, and determine whether the acquired facial expression information satisfies the facial expression condition. The facial expression that can be sensed by the control module 130 may be a smiling face, a laughing face, a blank face, a crying face, a frowning face or the like.

The gesture condition may be a condition related to whether a character in video call makes a specific body gesture or hand gesture. The control module 130 and/or the selection condition creation module 140 may determine a gesture that a character in video call makes by analyzing a video call screen.

The control module 130 and/or the selection condition creation module 140 does not determine an actual sentiment or emotional state of a corresponding character and may determine a facial expression or a gesture that matches an external state of a character displayed on a video call screen.

The wearing item condition may be a condition related to whether a character in video call is wearing a specific item. The wearing item may include various clothes and accessories that the character is wearing. For example, a wearing item may be glasses, a necklace, ear rings, a hat, clothes or the like. In addition, the wearing item condition may include a condition related to an appearance, a shape, a pattern, or a color of a wearing item.

Other than this, the appearance condition may further include conditions related to the shape of a face and the shapes of eyes, nose, mouth, ears and the like.

The background condition may be a condition related to visual factors around a character in video call. For example, the background condition may be a condition related to whether a specific object exists in the background of a character in video call, a condition related to a color of the background around a character, or the like. An object appearing in the background may be an artificial object or a natural object. As described below, the control module 130 and/or the selection condition creation module 140 may acquire information on the background around a character by analyzing a video call screen.

The time-related condition may be a condition related to a time that the user is making a video call. For example, the time-related condition may be a condition related to a year, a month, a date, a quarter, a season or the like of making a video call.

The location-related condition may be a condition related to a location of a user in video call. For example, the location-related condition may be a condition related to a country, a city, an administrative district, coordinates and the like.

The profile condition may be a condition related to the profile of a user in video call. The profile condition may be a condition related to sex, age, date of birth, blood type, jobs, nicknames, job experiences, department, nationality, hobbies, special skills, likings, religions, or other personal information.

The profile of a specific user may be information previously inputted by a corresponding user. For example, the user may previously input his or her profile information in the video call providing system 100 before performing a video call, and the video call providing system 100 may store the profile information of the user in the storage module 120.

The call voice-related condition may be a condition related to a call voice spoken by a speaker during a video call. For example, the call voice-related condition may be a condition related to a voice tone or content (context) of a spoken voice.

Meanwhile, the storage module 120 may store a visual object selection model.

The visual object selection model may include relation information between the at least one selection condition and the at least one visual object. That is, the visual object selection model may be a model which defines the relation information between two parties to derive a specific visual object from at least a selection condition.

Describing an exemplary embodiment of a visual object of a simplest form for the convenience of understanding, the visual object selection model may be configured as a pair of a selection condition list configured of at least a selection condition and a visual object corresponding thereto. For example, in this embodiment, the visual object selection model may be configured of at least a piece of relation information formed like ($<C_1, \ldots, C_N>$, V) (here, $C_1$ to $C_N$ are arbitrary selection conditions, N is an integer equal to or greater than 1, and V is a visual object or information for distinguishing the visual object).

In another embodiment, the visual object selection model may be configured as a pair of at least a selection condition and a list of two or more visual objects corresponding thereto. For example, in this embodiment, the visual object selection model may store relation information formed like ($<C_1, \ldots, C_N>, <V_1, \ldots, V_M>|<P(V_1), \ldots, P(V_M)>$) (here, $C_1$ to $C_N$ are arbitrary selection conditions, N is an integer equal to or greater than 1, $V_1$ to $V_M$ are arbitrary visual objects or information for distinguishing the visual objects, M is an integer equal to or greater than 2, and $P(V_m)$ is the probability for being $V_m$ among $V_1$ to $V_M$).

In another embodiment, the visual object selection model may be a form of a result learned by machine learning. For example, the visual object selection model may be a neural network model learned by deep learning, a Bayesian model learned by Bayesian logistic regression method, or the like.

Other than this, the form and the implementation of the visual object selection model may be diverse.

Meanwhile, the visual object selection model stored in the storage module 120 may be created or updated by the selection condition creation module 140 and the selection model creation module 150.

Whenever a visual object is selected by a user while a plurality of terminals 200-1 to 200-N performs video call, the selection condition creation module 140 may create a selection condition corresponding to the selected visual object.

The selection model creation module 150 may create the visual object selection model on the basis of a selection condition corresponding to each visual object selected by a terminal in which a video call is in progress.

Hereinafter, a visual object used by the selection condition creation module 140 to create a selection condition will be referred to as a training visual object.

Figure 6:
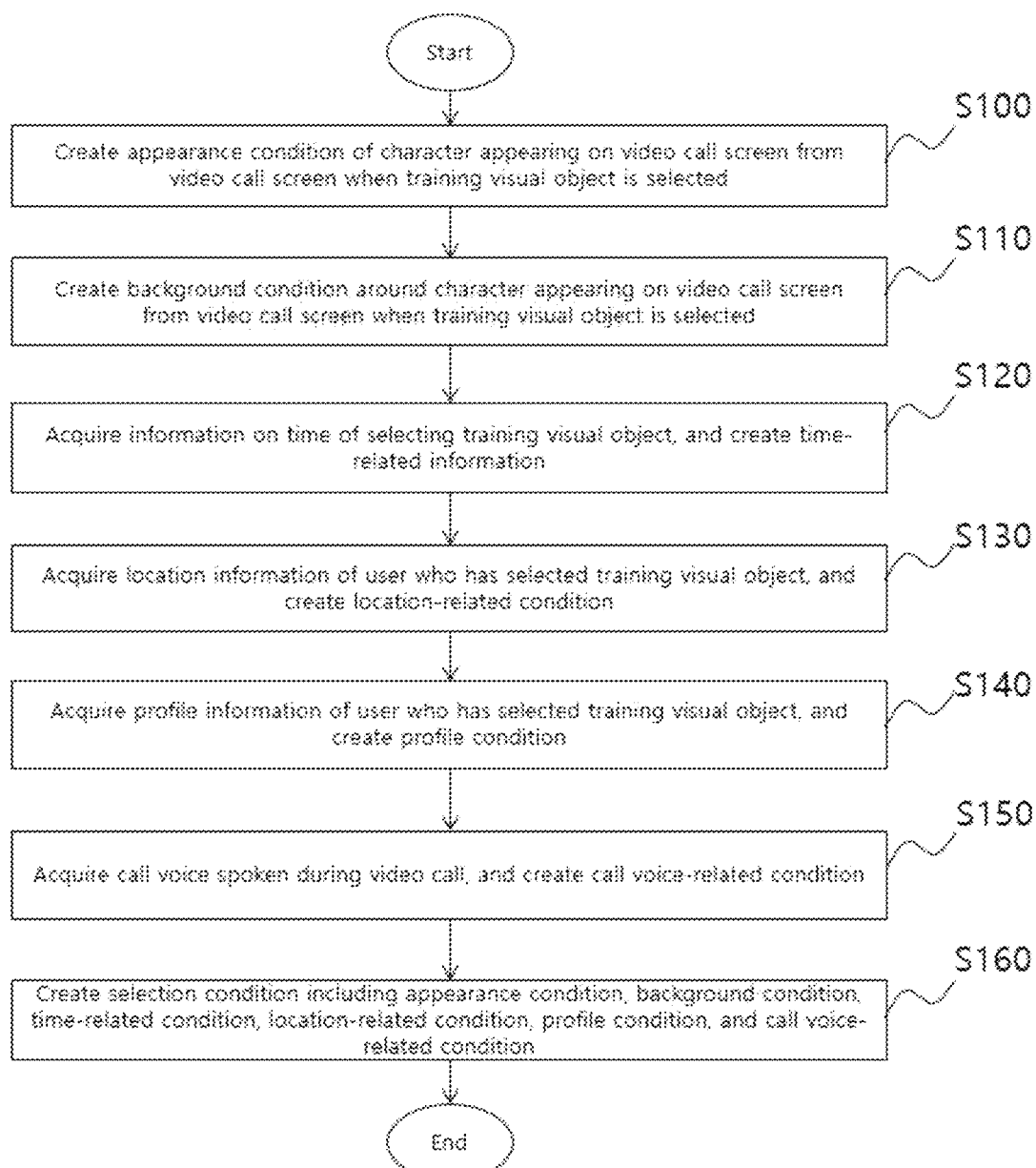
FIG. 6 is a flowchart illustrating a method of creating a selection condition by a video call providing system constructed according to an exemplary embodiment of the present disclosure.

FIG. 6 is a flowchart illustrating a method of creating a selection condition by the selection condition creation module 140 of the video call providing system constructed according to an exemplary embodiment of the present disclosure.

Referring to FIG. 6, when a user in video call selects a training visual object, the selection condition creation module 140 may create an appearance condition of a character, which will be included in a selection condition corresponding to the selected training visual object, from a video call screen at the time of selecting the training visual object (step S100).

The video call screen at the time of selecting the training visual object may be a sheet of image photographed at a selected point of time, a plurality of images photographed from a specific point of time before a selected point of time to the selected point of time and/or a plurality of images photographed from a selected point of time to a specific point of time after the selected point of time.

In addition, the selection condition creation module 140 may create a background condition, which will be included in a selection condition corresponding to the selected training visual object, from a video call screen at the time of selecting the selected training visual object (step S110).

In an exemplary embodiment, the selection condition creation module 140 may recognize objects around a character appearing in a video call screen on the basis of the video call screen, to acquire background information around the character appearing on the video call screen.

The selection condition creation module 140 may acquire appearance information and/or background information of a character appearing in the video call screen through various publicized image analysis techniques.

In addition, the selection condition creation module 140 may acquire information on the time of selecting the selected training visual object and create a time-related condition, which will be included in a selection condition corresponding to the selected training visual object, on the basis of the acquired time information (step S120).

The time-related information may be information related to the time of progressing a video call by a user.

In an exemplary embodiment, the selection condition creation module 140 may acquire the time information through a timer inside the system or receive the time information from an external time server and may create a variety of time-related information from the acquired time information.

In addition, the selection condition creation module 140 may acquire location information of a user who has selected the selected training visual object and create a location-related condition, which will be included in a selection condition corresponding to the selected training visual object, on the basis of the acquired location information (step S130).

The location-related information may be information related to the location of a user in video call.

In an exemplary embodiment, the selection condition creation module 140 may create a variety of location-related information through the location information provided by a terminal in video call. Or, the selection condition creation module 140 may directly receive the location-related information from a terminal in video call.

The selection condition creation module 140 may acquire profile information of a user who has selected the training visual object and create a profile condition, which will be included in a selection condition corresponding to the selected training visual object (step S140).

In an exemplary embodiment, the selection condition creation module 140 may acquire profile information of a user previously stored in the storage module 120.

The selection condition creation module 140 may acquire a call voice spoken while video call is performed during a predetermined period including the specified point of time of selecting the selected training visual object, and create a call voice-related condition, which will be included in a selection condition corresponding to the selected training visual object, from the acquired call voice (step S150).

As described above, in an exemplary embodiment, the voice-related condition may include a voice tone. In this case, the selection condition creation module 140 may create information on the voice tone by analyzing the waveform of the call voice.

In addition, in an exemplary embodiment, the voice-related condition may include context information of the call voice. In this case, the selection condition creation module 140 may convert the call voice into text by applying a speech-to-text technique to the call voice. In addition, according to embodiments, the selection condition creation module 140 may acquire the context information from the call voice by performing a semantic analysis on the converted text.

Meanwhile, the selection condition creation module 140 may create a selection condition including the appearance condition, the background condition, the time-related condition and/or the location-related condition (step S160).

Referring to FIG. 5 again, the selection model creation module 150 may create a visual object selection model by performing machine learning.

The selection model creation module 150 may create a visual object selection model by applying various machine learning methods.

The machine learning is acquiring an inference function from learning data, and particularly, the machine learning performed by the selection model creation module 150 may be supervised learning. The supervised learning may mean machine learning which performs learning through an input data assigned with a label. The supervised learning may derive an inference function by analyzing the learning data and infer a result value of the input data thereafter.

For example, the selection model creation module 150 may create a visual object selection model by applying a machine learning method, such as k-nearest neighbor (k-NN), neural network, deep Learning, support vector machine (SVM), decision tree, random forest, k-means clustering, hidden Markov model, or Bayesian logistic regression.

The selection model creation module 150 may be a module which performs a learning phase among two phases of machine learning, i.e., the learning phase and an inference phase.

The learning data of the machine learning performed by the selection model creation module 150 may be the training visual object, selected while the plurality of terminals 200 performs video call, and a selection condition corresponding to each of the training visual objects. For example, a selection condition created by the selection condition creation module 140 may be a feature value of the learning data, and a training visual object corresponding thereto may be a label of the learning data.

The visual object selection model described above may be a form dependent on the machine learning performed by the selection model creation module 150.

After the learning is completed by the selection model creation module 150, the control module 130 may perform the inference phase based on a result of the learning.

That is, after the visual object selection model is created, the control module 130 may determine a recommended visual object that will be displayed on at least a terminal performing video call (e.g., 200-1) and a counterpart terminal (e.g., 200-2) of the terminal 200-1, at the specified point of time of displaying a visual object, based on the visual object selection model.

In an exemplary embodiment, the specified point of time of displaying a visual object may be a point of time of beginning a video call by two terminals. Or, it may be a point of time at which the specified period of time has elapsed since the two terminals begin a video call. Or, it may be a point of time at which a user in video call inputs a command informing to recommend a visual object into the video call providing system 100.

FIG. 7 is a flowchart illustrating a method of determined a recommended visual object by the control module 130 of video call providing system constructed according to an exemplary embodiment of the present disclosure.

Referring to FIG. 7, the control module 130 may acquire appearance information of a character appearing on a video call screen photographed by the terminal at the specified point of time of displaying the visual object on the basis of video call screen (step S200).

In an exemplary embodiment, the control module 130 may acquire facial expression information for specifying a facial expression of a character and gesture information for specifying a gesture of the character on the basis of the video call screen and may acquire wearing item information for specifying wearing items that the character wears.

Meanwhile, the control module 130 may acquire background information around the character appearing on the video call screen on the basis of the video call screen photographed by the terminal at the specified point of time of displaying the visual object (step S210).

In addition, the control module 130 may acquire location information of the terminal that is in video call (step S220).

In addition, the control module 130 may acquire profile information of the user of the terminal (step S230).

In addition, the control module 130 may acquire call voice-related information from a call voice spoken during the video call (step S240).

Then, the control module 130 may determine any one of the at least one visual object as the recommended visual object on the basis of at least some of the appearance information of the character, the background information, the location information of the terminal, the specified point of time of displaying the visual object, the profile information, and the call voice-related information and the visual object selection model (step S250).

In an exemplary embodiment, the control module 130 may confirm a visual object corresponding to the selection condition by applying the selection condition, which is configured of at least some of the appearance information of the character, the background information, the location information of the terminal and the specified point of time of displaying the visual object, to the visual object selection model.

Referring to FIG. 5 again, the display module 160 may display the recommended visual object determined by the control module 130 on the video call screen of the terminal (e.g., 200-1) or a counterpart terminal (e.g., 200-2) of the terminal.

The automatically selected recommended visual object may be immediately displayed on the terminal 200-1 and/or 200-2. Or, the recommended visual object may be placed at a specific position (e.g., on the top) on a recommended list including the recommended visual object or displayed on the list together with a special mark indicating that it is a recommendation object.

Meanwhile, according to embodiments, the video call providing system 100 may include a processor and a memory for storing a program executed by the processor. Here, when the program is executed by the processor, the program may control the video call providing system 100 according to this embodiment to perform the visual object providing method described above.

The processor may control hardware and/or software configuring the video call providing system 100 and include a CPU, a GPU, an MPU, a microprocessor and the like. The memory may include, for example, flash memory, ROM, RAM, EEROM, EPROM, EEPROM, a hard disk and a register.

Meanwhile, the visual object providing method according to an exemplary embodiment of the present disclosure may be implemented as a computer-readable program command in appearance and stored in a computer-readable recording medium, and control programs and target programs according to an exemplary embodiment of the present disclosure may also be stored in the computer-readable recording medium. The computer-readable recording medium includes all kinds of recording devices in which data that can be read by a computer system are stored.

Program commands recorded in the recording medium may be program commands specially designed and configured for the present invention or program commands publicized to and utilized by those skilled in the field of software.

The examples of the computer-readable recording medium include magnetic media such as a hard disk, a floppy disk and a magnetic tape, optical media such as CD-ROM and DVD, magneto-optical media such as a floptical disk, and hardware device specially configured to store and perform program commands, such as ROM, RAM, flash memory and the like. In addition, the computer-readable recording medium may be distributed in computer systems connected through networks, and computer-readable codes may be stored and executed in a distributed manner.

Examples of the program commands include a device for electronically processing information using an interpreter or the like, e.g., a high-level language code that can be executed by a computer, as well as a machine code such as a code created by a compiler.

The hardware device described above may be configured to operate as one or more software modules to perform the operation of the present invention, and vice versa.

When a user himself or herself finds an appropriate visual object, a feeling of tension may grow since the interaction with a counterpart is difficult. However, in the case of the video call providing method according to an exemplary embodiment of the present disclosure, a visual object appropriate to a situation may be selected without intervention of a user. Accordingly, when the video call providing method according to an exemplary embodiment of the present disclosure is applied to various kinds of chatting/communication services (e.g., video call, image chatting, voice chatting, character chatting and the like), the visual objects may function as an ice breaker which eliminates a feeling of tension or awkwardness and softens the atmosphere of conversation.

In addition, there is an effect of enhancing friendliness between two conversing users or inducing interest and making fun of the other parties.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of providing video call service by performing the video call on user terminals, the method comprising the steps of:

storing, by a video call providing system, a visual object selection model including relation information between at least one visual object and at least one selection factor; and automatically determining, by the video call providing system, a recommended visual object to be displayed on at least one of user terminals performing video call, and automatically recommending the visual object at a point of specified for displaying a visual object, based on the visual object selection model and a selection condition, the selection condition comprising: at least one appearance condition of a character; at least one background condition; at least one time-related condition; at least one location-related condition; a profile condition; and a call voice-related condition, wherein the determining of the recommended visual object comprises:

acquiring the at least one appearance information of a character appearing on a video call screen from the video call screen photographed by at least one of the user terminals at a point of time specified for displaying the visual object;

acquiring the at least one background information around the character appearing on the video call screen from the video call screen photographed by at least one of the user terminals at the point of time specified for displaying the visual object;

acquiring location information of the user terminals;

acquiring profile information of a user of the user terminals;

acquiring call voice-related information from a call voice of the video call performed at the user terminals; and determining any one of the at least one visual object as the recommended visual object based on at least one of the at least one appearance information of the character, the at least one background information, the location information of the user terminals, the point of time specified for displaying the visual object, the profile information and the call voice-related information, and the visual object selection model, wherein the storing the visual object selection model comprises:

specifying, by the video call providing system, the selection condition corresponding to a training visual object, the training visual object being selected by a user while the user terminals perform video call;

creating, by the video call providing system, the visual object selection model based on the selection condition corresponding to the selected training visual object; and
storing the created visual object selection model, by the video call providing system, and
wherein the specifying of the selection condition corresponding to the selected training visual object comprises:
creating an appearance condition of the character appearing on the video call screen of the user terminals, which will be included in the selection condition corresponding to the selected training visual object, from the video call screen in response to the selected training visual object being selected;
creating a background condition around the character appearing on the video call screen of the user terminals, which will be included in the selection condition corresponding to the selected training visual object, from the video call screen in response to the selected training visual object being selected;
creating a time-related condition by acquiring information on a time of the selected training visual object being selected, which will be included in the selection condition corresponding to the selected training visual object;
creating a location-related condition by acquiring location information of a user who has selected the selected training visual object, which will be included in the selection condition corresponding to the selected training visual object;
creating a profile condition by acquiring profile information of the user who has selected the selected training visual object, which will be included in the selection condition corresponding to the selected training visual object; and
creating a call voice-related condition by acquiring a call voice spoken during a predetermined time period including a point of time of selecting the selected training visual object, which will be included in the selection condition corresponding to the selected training visual object.

2. The method according to claim 1, wherein each of the at least one appearance condition of a character includes at least one of a facial expression condition, a gesture condition, and a wearing item condition, and
wherein the acquiring of the at least one appearance information of a character appearing on a video call screen comprises:
acquiring facial expression information of the character from the video call screen of the user terminals;
acquiring gesture information of the character from the video call screen of the user terminals; and
acquiring wearing item information of the character from the video call screen of the user terminals.

3. The method according to claim 1, wherein each of the call voice-related conditions includes at least one of a voice tone condition and a communication context condition, and
the acquiring of the call voice-related information comprises:
acquiring voice tone information from a call voice spoken during the video call; and
acquiring call context information from the call voice spoken during the video call.

4. The method according to claim 1, wherein the creating of the visual object selection model comprise:

creating the visual object selection model by performing machine learning using a training visual object selected by at least one of the user terminals and the selection condition corresponding to each of the training visual objects as learning data.

5. The method according to claim 1, further comprising:
displaying the determined visual object on a video call screen of at least one of the user terminals.

6. A computer-readable recording medium storing instructions that, when executed by a computer, causes it to perform the method of claim 1.

7. A computing system comprising:
a processor; and
a memory storing instructions that, when executed by the processor, cause the computing system to perform the method of claim 1.

8. A system for providing video call, the system comprising:
a storage module configured to store a visual object selection model including relation information between at least one visual object and at least one selection condition;
a control module configured to automatically determine a recommended visual object that will be displayed on at least one of a plurality of user terminals performing the video call, at a point of time specified for displaying a visual object, based on the visual object selection model and a selection condition, the selection condition including: at least one appearance condition of a character; at least one background condition; at least one time-related condition; at least one location-related condition; a profile condition; and a call voice-related condition;
a selection condition creation module configured to specify the selection condition corresponding to the selected training visual object, in response to a training visual object being selected by a user while the user terminals performs video call; and
a selection model creation module configured to create the visual object selection model based on the selection condition corresponding to each of the selected training visual objects,
wherein the control module is configured to:
acquire the at least one appearance information of a character appearing on a video call screen from the video call screen photographed by at least one of the user terminals at the point of time specified for displaying the visual object;
acquire the at least one background information around the character appearing on the video call screen from the video call screen photographed by at least one of the user terminals at the point of time specified for displaying the visual object;
acquire location information of the user terminals;
acquire profile information of a user of the user terminals;
acquire call voice-related information from a call voice of the video call performed at the user terminals; and
determine any one of the at least one visual object as the recommended visual object based on at least one of the at least one appearance information of the character, the at least one background information, the location information of the user terminals, the point of time specified for displaying the visual object, the profile information and the call voice-related information and the visual object selection model, wherein the selection condition creation module is configured to:
    create an appearance condition of the character appearing on the video call screen, which will be included in the selection condition corresponding to the selected training visual object, from the video call screen in response to the selected training visual object being selected;
    create a background condition around the character appearing on the video call screen, which will be included in the selection condition corresponding to the selected training visual object, from the video call screen in response to the selected training visual object being selected;
    create a time-related condition by acquiring information on a time of the selected training visual object being selected, which will be included in the selection condition corresponding to the selected training visual object;
    create a location-related condition by acquiring location information of a user who has selected the selected training visual object, which will be included in the selection condition corresponding to the selected training visual object;
    create a profile condition by acquiring profile information of the user who has selected the selected training visual object, which will be included in the selection condition corresponding to the selected training visual object; and
    create a call voice-related condition by acquiring a call voice spoken during a predetermined time period including a point of time of selecting the selected training visual object, which will be included in the selection condition corresponding to the selected training visual object.

9. The system constructed according to claim 8, wherein each of the at least one appearance condition of a character included in the visual object selection condition includes: at least one of a facial expression condition, a gesture condition and a wearing item condition, and
    wherein the control module is configured to acquire: facial expression information of the character; gesture information of the character; and wearing item information of the character from the video call screen in order to acquire the appearance information of the character appearing on the video call screen from the video call screen photographed by the user terminal at the point of time specified for displaying the visual object.

10. The system constructed according to claim 8, wherein the selection model creation module is configured to create the visual object selection model by performing machine learning using a training visual object selected by at least one of the user terminals and the selection condition corresponding to each of the training visual objects as learning data.

11. The system constructed according to claim 8, further comprising a display module for displaying the determined recommended visual object on a video call screen of the user terminal or a counterpart user terminal of the user terminal.

* * * * *